Jan. 26, 1932.  C. K. WOOD ET AL  1,843,057
CLAMP
Filed Nov. 3, 1930
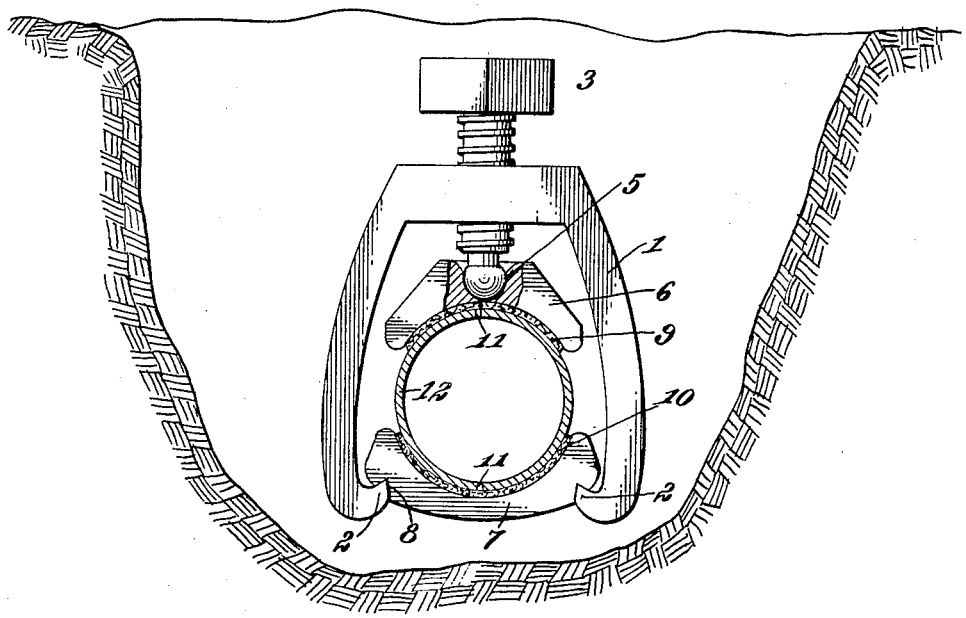
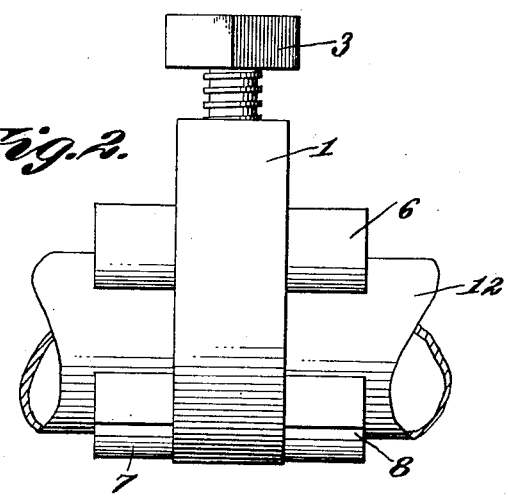
Charles K. Wood,
Raymond Wood,
INVENTOR
BY Victor J. Evans
ATTORNEY
WITNESS:

Patented Jan. 26, 1932

1,843,057

UNITED STATES PATENT OFFICE

CHARLES K. WOOD AND RAYMOND WOOD, OF CHESTERHILL, OHIO

CLAMP

Application filed November 3, 1930. Serial No. 493,140.

Our present invention relates to a pipe repairing device such as is employed for stopping leaks in pipes such as oil, gas or water conducting pipes.

The primary object of the invention is the provision of a leak stopping means for pipes that can be easily and quickly applied to a pipe to effectively patch and stop the leak therein regardless of whether the leak occurs on the bottom of the pipe, which is most frequent, the top or the sides of the pipe.

A further object is to provide a device which is characterized by simplicity in construction, cheapness in manufacture, ease in application and thorough efficiency in operation.

To the attainment of the foregoing the invention consists in the improvement hereinafter described and definitely claimed.

In the drawings:

Figure 1 is a sectional view through a pipe having leaks therethrough stopped in accordance with this invention.

Figure 2 is a side elevation of the improvement.

Salt water in a pipe line collects in the bottom thereof and eats from the inside. All mineral water running under the pipe eats from the outside on the bottom of such pipe, so that in the majority of instances the leak occurs in the under side of the pipe. In the majority of leak repairing devices no preparation is made for taking care of leaks in the under side of the pipe and in the type of pipe repairing devices which take care of leaks on the under side of the pipe a large excavation must be made when the pipe is buried in the ground in order that space is provided for the manipulation of the nuts that are screwed on the yoke or saddle of the repairing device.

As the description progresses it will be apparent that my improvement may be easily and quickly attached to a pipe in a manner that will require only a small exertion and that the improvement provides means for patching or temporarily repairing a pipe to stop the leaks therein whether the leaks are diametrically opposite each other or either at the sides or top and bottom of the pipe. Also while not illustrated by the drawings it will be apparent that the improvement may be easily and successfully employed in pipe lines which are arranged close to concrete walls or floors where it is practically impossible to apply devices for a similar purpose.

In carrying out our invention we employ a substantially U-shaped stirrup 1. The curved arms of the stirrup have their ends inwardly and upwardly directed to provide what we will term hooks 2 and screwed through the top of the stirrup 1 there is the shank of a headed bolt member 3. The shank has its outer end provided with a ball head that is received in a rounded socket 5 that enters from the top of the upper and movable saddle member 6 of the improvement. The under face of the saddle member is concaved.

The numerals 7 designate the lower saddle of the improvement. This saddle is provided, on its under face, adjacent its ends with substantially V-shaped notches 8 to receive therein the points of the hooks 2 and the upper rounded face of the saddle 7 is concaved. The concaved faces of the saddle members 6 and 7 are designed to receive therein gaskets that provide patches 9 and 10 for openings 11—11 which may occur in a pipe line 12.

When the pipe line is embedded in the ground only a small excavation need be made sufficient for the improvement being received therein and if leaks occur at both the bottom and top or at the sides of the pipe 12 the device is manipulated to bring the patch gaskets 9 and 10 over such openings. The bolt 3 which has a swivel connection with the saddle 6 is screwed home in order to tightly compress the patches against the pipe to fully cover the openings therein so that the pipe is effectively temporarily repaired.

In removing the device the bolt is unscrewed which permits of the removal of the lower stirrup 7 and the stirrup with the upper saddle may be drawn upwardly over the pipe, it being noted that the hooked ends 2 of the stirrup are spaced a greater distance away from each other than is the cross sectional diameter of the pipe 12. The stirrup 7 is then replaced and the device may again be employed upon another part of the pipe line. The patch members 9 and 10 may be of plastic or other adhesive material, which plugs the openings in the pipes and thereby repairs the same.

Having described the invention, we claim:

A device for repairing openings in a pipe line, comprising a stirrup which has its arms at its open end inwardly and upwardly directed to provide hooks, the said hooks being spaced to permit of the stirrup being arranged over and fully receiving a pipe therein, a lower removable and longitudinally adjustable saddle member having notches to receive the ends of the hooks therein and having its inner face concaved to afford a support for the pipe, a bolt member screwed through the top of the stirrup, an upper removable saddle member having a concaved face to engage with the pipe, said upper saddle member having a rounded socket entering from the top thereof and having a tapered opening, and the bolt member having a ball end to be received in the socket.

In testimony whereof we affix our signatures.

CHARLES K. WOOD.
RAYMOND WOOD.